US006188465B1

(12) United States Patent
Rees et al.

(10) Patent No.: US 6,188,465 B1
(45) Date of Patent: Feb. 13, 2001

(54) DUAL DEPTH OF FOCUS IMAGING SYSTEM (75) Inventors: James D. Rees, Pittsford; Ned J. Seachman, Penfield; Jagdish C. Tandon, Fairport, all of NY (US)

(73) Assignee: Xerox Corporation, Stamford, CT (US)

( * ) Notice: Under 35 U.S.C. 154(b), the term of this patent shall be extended for 0 days.

(21) Appl. No.: 09/300,355

(22) Filed: Apr. 27, 1999

Related U.S. Application Data (63) Continuation-in-part of application No. 08/786,539, filed on Jan. 21, 1997, now abandoned.

(51) Int. Cl.$^7$ ................................................. G03B 27/52
(52) U.S. Cl. ........................... 355/55; 355/40; 355/41
(58) Field of Search .................... 355/23–26, 40, 355/41, 50, 55, 67–71; 358/474, 496–498, 407, 408

(56) References Cited

U.S. PATENT DOCUMENTS

| 3,658,407 | 4/1972 | Kitano et al. .................. 350/96 B |
| 4,331,380 | 5/1982 | Rees et al. .................. 350/96.25 |
| 4,394,083 | 7/1983 | Rees .......................... 355/1 |
| 4,415,258 | 11/1983 | Rees et al. .................. 355/8 |
| 4,459,010 | 7/1984 | Hinton et al. ................ 355/8 |
| 4,595,275 | 6/1986 | Sonobe ....................... 355/8 |
| 4,998,806 | 3/1991 | Tsuji et al. .................. 350/413 |
| 5,166,999 | 11/1992 | Rees et al. .................. 385/120 |
| 5,260,718 | 11/1993 | Rommelmann et al. ........ 346/107 R |
| 5,307,175 | * 4/1994 | Seachman .................... 358/401 |
| 5,373,352 | 12/1994 | Uto ........................... 355/233 |
| 5,450,157 | 9/1995 | Rees .......................... 355/1 |
| 5,463,451 | * 10/1995 | Acquaviva et al. ............ 355/233 |
| 5,506,694 | 4/1996 | Isobe ......................... 358/472 |
| 5,532,845 | * 7/1996 | Gusmano ..................... 358/474 |
| 5,694,528 | 12/1997 | Hube ......................... 395/113 |
| 5,841,540 | 11/1998 | Mondie ....................... 356/381 |

FOREIGN PATENT DOCUMENTS 10-229473  8/1998  (JP).

* cited by examiner

Primary Examiner—Russell Adams
Assistant Examiner—Hung Henry Nguyen
(74) Attorney, Agent, or Firm—John M. Kelly; Davis E. Henn (57) ABSTRACT

A raster input scanner, and a reproduction system that uses that input scanner, having multiple depths of focus. The raster input scanner includes a light source for emitting light toward an image bearing member and at least two lens arrays, with the ability to selectably position any one lens array in optical conjugate relationship between the image bearing member on a transparent platen and a photosensor array. One of the lens arrays has a first depth of focus, while the other lens array has a second depth of focus that is different than the first depth of focus. Beneficially, the input scanner responds to an operator selection of which depth of focus is to be used to image a given image bearing member.

23 Claims, 6 Drawing Sheets

DUAL DEPTH OF FOCUS IMAGING SYSTEM

This application is a continuation-in-part of application(s) Ser. No(s). 08/1786,539, filed Jan. 21 1997 now abandoned

FIELD OF THE INVENTION

This invention relates to an electronic system having a raster input scanner (RIS) hat scans an original document. More particularly, the present invention relates to raster nput scanners having multiple depth of field gradient index lens arrays.

BACKGROUND OF THE INVENTION

Raster input scanner (RIS) systems are frequently employed in electrophotographic copiers and facsimile machines. Typically, a raster input scanner comprises an elongated array of photosensors mounted in optical alignment with a lens or lens array. In operation, light reflected from an image-bearing member is captured by the lens or lens array and focused onto the photosensors. The photosensors sense the reflected light and produce outputs that are sent to other systems for amplification, storage, display, reproduction, or manipulation.

While various types of raster input scanners are known, one such type uses a lens array comprised of bundled gradient index optical fibers or rods. Reference U.S. Pat. No. 3,658,407, issued Apr. 25, 1972 to Ichiro Kitano et al. for a description of light conducting rods that have a cross sectional refractive index distribution that varies parabolically outward from a center portion. Those rods can act as focusing lenses for light captured at one end. Such lenses are produced under the trade name "SELFOC;" a name which is owned by Nippon Sheet Glass Company, Ltd. Relevant optical characteristics of gradient index lens arrays are described in an article entitled "Optical properties of GRIN fiber lens arrays: dependence on fiber length", by William Lama, *Applied Optics*, Aug. 1, 1982, VoL 21, No. 15, pages 2739–2746.

To form a raster input scanner, a gradient index lens array is disposed between a photosensor array and the portion of an image-bearing surface illuminated by a light source. Light reflected by that surface is captured by the gradient index lenses and focused onto the photosensor.

In most such imaging applications it is important that the gradient index lenses have an adequate depth of focus. Otherwise, small changes in the relative positions of the gradient index lenses and the surface being scanned will cause relatively large changes in image quality. Indeed, it is usually desirable that the depth of focus of a gradient index array be as large as possible while meeting the radiometric efficiency requirements.

Figure 1:
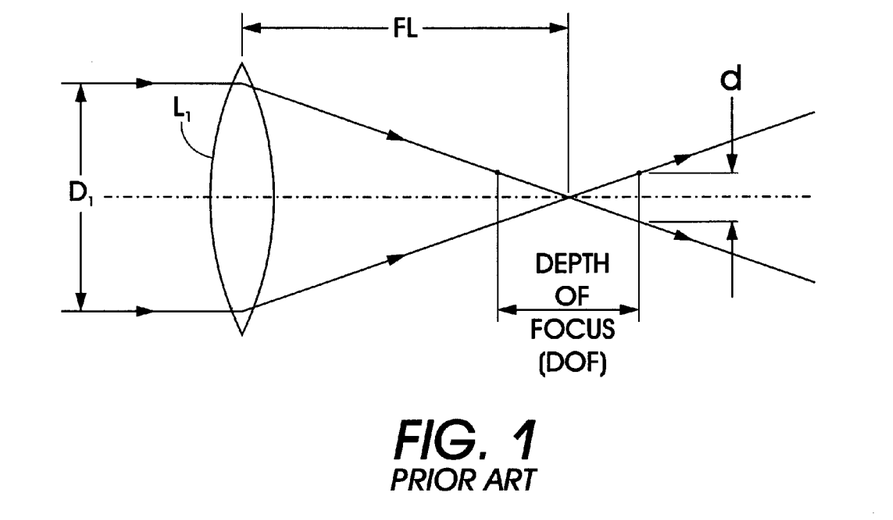
FIG. 1 illustrates a prior art lens L1, and the relationship between that lens's aperture, focal length, and depth of focus.

FIG. 1 is useful in explaining several important concepts. The illustrated conventional spherical lens L1 has an exit pupil diameter $D_1$, a focal length FL, and a depth of focus DOF. The relative aperture or f/# of lens L1 is the focal length FL divided by the diameter of the exit pupil, or:

$$f/\# = FL/D_1.$$

Figure 2:
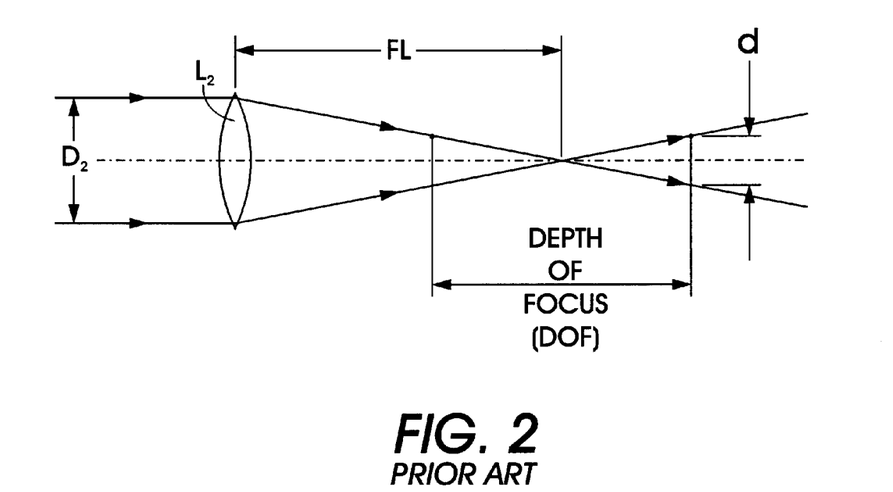
FIG. 2 illustrates a prior art lens L2, and the relationship between that lens's aperture, focal length, and depth of focus.

As is well known, the depth of focus of a conventional lens can be increased (within limits imposed by the diffraction of light by the lens aperture) by increasing its relative aperture (or f/#). It is also well known that an increase in the depth of focus, when achieved by increasing f/#, results in a reduced radiometric efficiency (ratio of image irradiance to object radiance) and thus in the scanner's signal to noise ratio. Two relationships explain the trade-off of an increase in the depth of focus and a reduction in radiometric efficiency for conventional lenses. First, the radiometric efficiency is inversely proportional to $(f/\#)^2 = (FL/D_1)^2$. Second, the depth of focus (within limits previously described) is directly proportional to the f/#. For example, the f/# and thus the depth of focus (DOF) of the lens L2 of FIG. 2 is greater than that of the depth of focus of the lens L1 since the lens L2 has a smaller exit pupil diameter $D_2$. This is true even though the focal lengths (FL) of lenses L1 and L2 are the same. However, since the radiometric efficiency is inversely proportional to $(f/\#)^2 = (FL/D)^2$, the radiometric efficiency for the lens L2 is less than that of the lens L1.

Simply put, while the depth of focus of a lens can be increased by increasing the relative aperture (f/#), the price to be paid is a loss in radiometric efficiency. Likewise, radiometric efficiency can be increased by reducing the relative aperture (f/#), but only with a reduction in the depth of focus.

However, for gradient index lenses it can be shown that the radiometric efficiency is proportional to $(n_o\sqrt{A}\times R)^2$, where $n_o$ is the axial refractive index of the optical rods, $\sqrt{A}$ is a constant which depends upon the gradient index of the lens, and R is the radius of the rods. It also can be shown that the depth of focus of a gradient index lens is inversely proportional to $n_o \sqrt{A}\times R$. Thus a tradeoff between radiometric efficiency and depth of focus can be achieved using the glass properties, ($n_o$, $\sqrt{A}$), the glass rod radius, R, or both.

Given the trade-off between radiometric efficiency and depth of focus it is possible to select a good compromise for many applications. For example, in applications where an image bearing surface is accurately located with respect to the gradient index lens array, such as when single sheets of paper are placed on a flat platen and then scanned, having a relatively narrow depth of focus is acceptable and radiometric efficiency can be optimized. However, in some applications the surfaces being imaged cannot be accurately located. For example, when scanning a bound book on a flat platen the physical location of the book's page(s) may vary with respect to the gradient index lens array. In such applications having a wide depth of focus is beneficial, even if the radiometric efficiency is reduced.

However, in prior art gradient index array based imaging systems a single tradeoff has to be made. As indicated above, any single tradeoff is not optimal for all conditions. Therefore, a technique which enables imaging with gradient index lens arrays having different depths of focus would be advantageous.

SUMMARY OF THE INVENTION

The principles of the present invention provide for gradient index lens based input scanners that have multiple depths of focus. An input scanner according to the present invention includes a light source for emitting light onto an image-bearing member, at least two movable gradient index lens arrays, and at least one photosensor array. The photosensor array receives light that is reflected by the image-bearing member and that is focused by one of the gradient index lens arrays. The first gradient index lens array includes an array of gradient index lenses having a first depth of focus while the second gradient index lens array includes an array of gradient index lenses having a second depth of focus that is different than the first depth of focus.

If only one photosensor is used, the first gradient index lens array and the second gradient index lens array are moved such that light reflected from the image-bearing member selectively passes through either the first gradient index lens array or the second gradient index lens array.

If multiple photosensors are used one photosensor is arranged to receive light that passes through the first gradient index lens array, a second photosensor is arranged to receive light that passes through the second gradient index lens array, and the first and second gradient index lens arrays are mechanically moved such that light reflected from the image-bearing member selectively passes through either said first gradient index lens array or through said second gradient index lens array.

Beneficially, the input scanner responds to an operator who selects which depth of focus is used to image a given image-bearing member. Generally, selection of the larger depth of focus lens array will be accompanied by longer photosensor signal integration times (possibly causing longer document scan times) to compensate for the reduced radiometric efficiency.

BRIEF DESCRIPTION OF THE DRAWINGS

Other aspects of the present invention will become apparent as the following description proceeds and upon reference to the drawings, in which.

Note that in the drawings that like numerals designate like elements.

DETAILED DESCRIPTION OF THE PREFERRED EMBODIMENT

Figure 3:
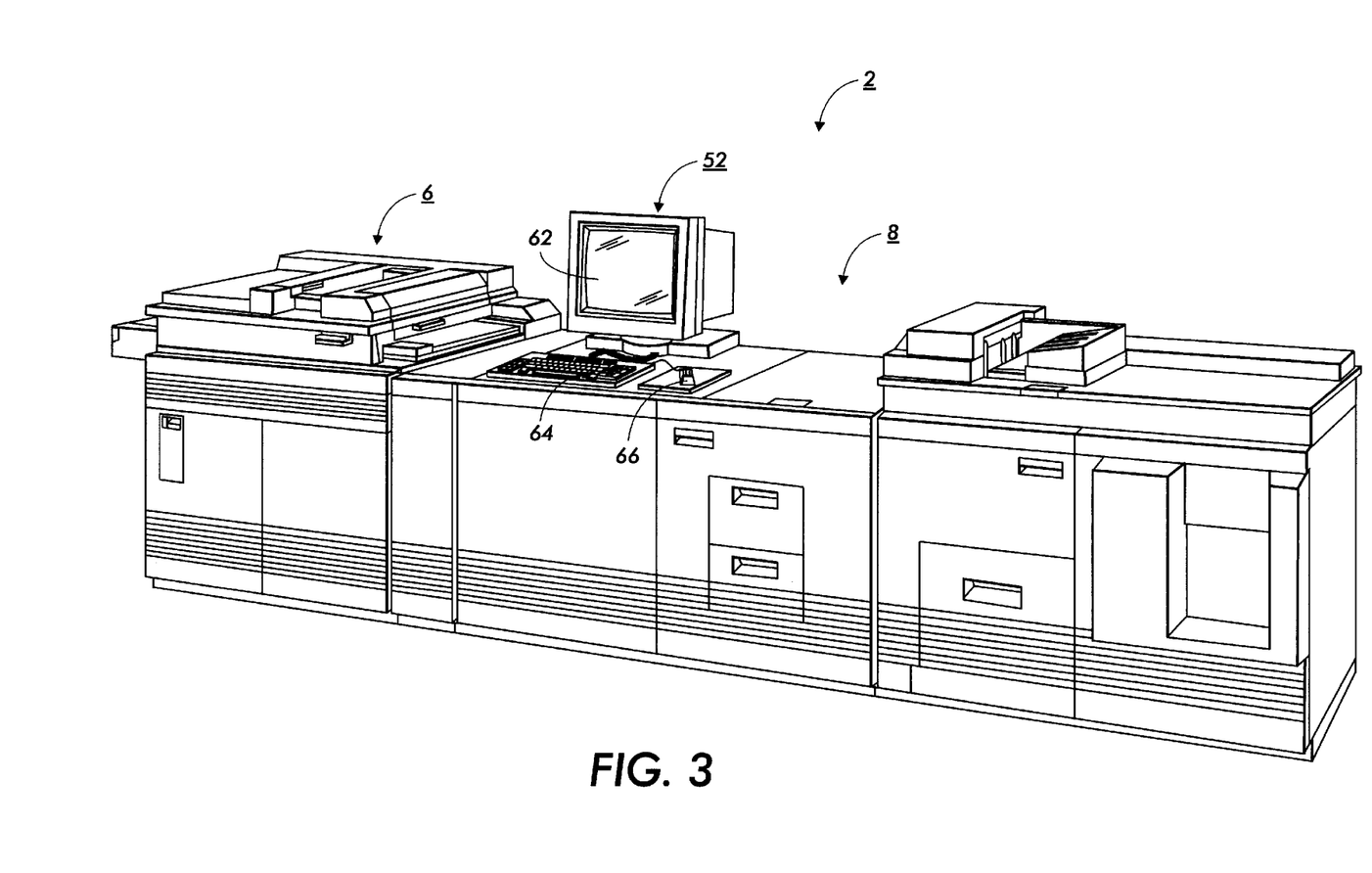
FIG. 3 is a view of an electronic reproduction system suitable for incorporating a raster input scanner according to the principles of the present invention.
Figure 4:
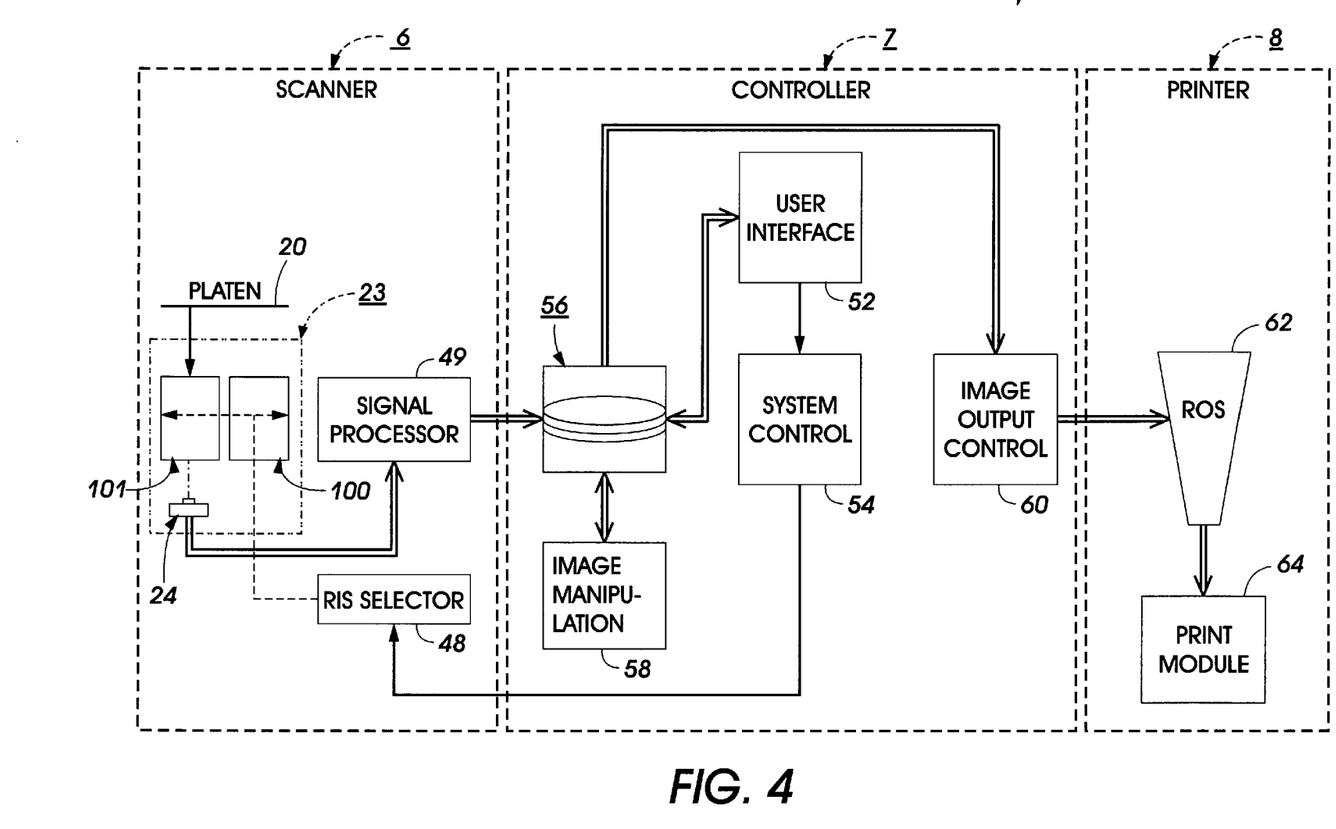
FIG. 4 is a block diagram of major subsystems of the reproduction system shown in FIG. 3.

FIG. 3 shows an exemplary laser based reproduction system 2 that is suitable for incorporating the principles of the present invention. Turning now to FIG. 4, which shows a block diagram of the reproduction system shown in FIG. 3, that reproduction system includes a scanner section 6, a controller section 7, and a printer section 8. The present invention is most closely associated with the scanner section 6. Therefore, it is to be understood that while a specific reproduction system is described, the principles of the present invention may be used with many other types of systems that use input scanners, including systems consisting solely of an input scanner.

Figure 5:
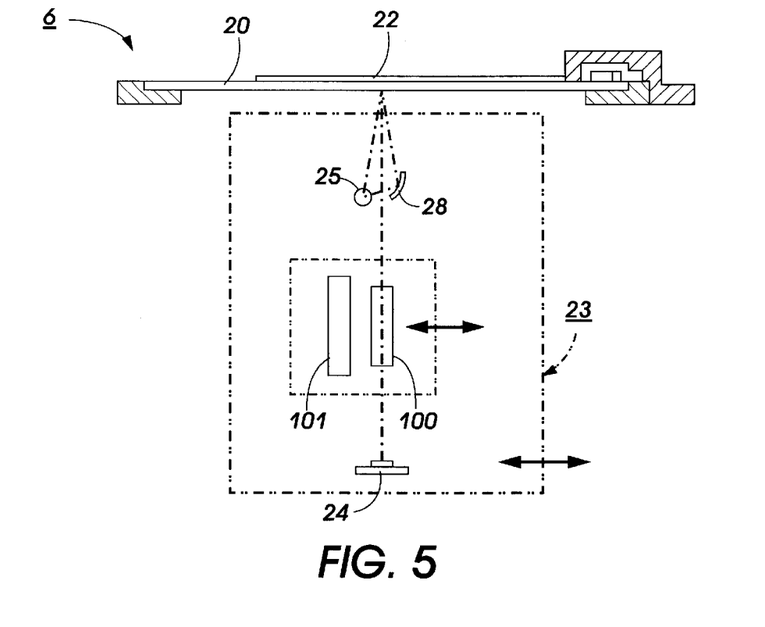
FIG. 5 is a schematic view of a raster input scanner system suitable for use in the reproduction system shown in FIG. 3 and which has a photosensor array receiving light from a first lens array.
Figure 6:
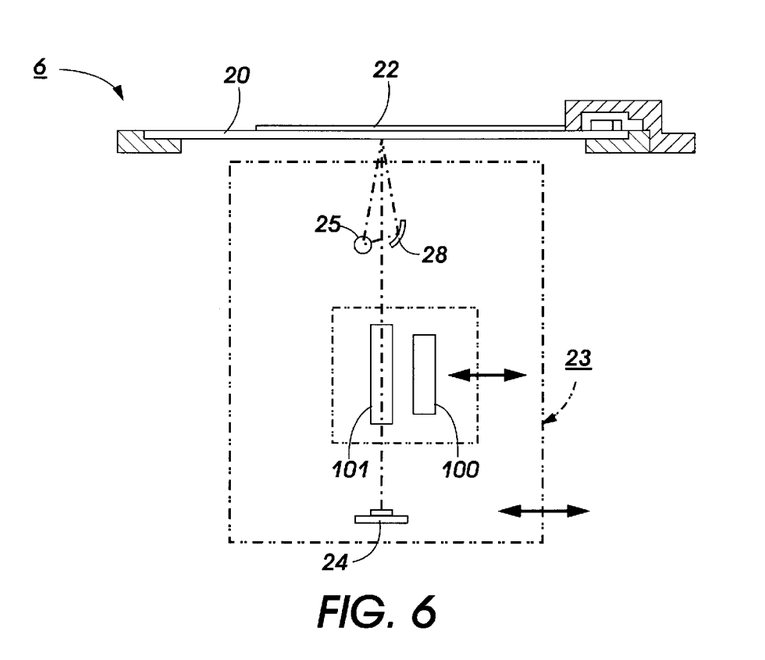
FIG. 6 shows the raster input scanner system of FIG. 5 with the photosensor array receiving light from a second lens array.

Referring now to FIGS. 4, 5 and 6, the scanner section 6 includes a transparent platen 20 on which an image bearing member 22 to be copied, such as a document or book, is located. An optical assembly 23 is supported for reciprocating scanning movement below the platen 20. Assembly 23 includes a first gradient index lens array 100 and a second gradient index lens array 101 that has different depth of focus than array 100. The optical assembly is further comprised of additional optical components that move together as a single unit. As shown in FIGS. 5 and 6, those additional components include an elongated fluorescent lamp 25 and an associated reflector 28 that cooperate to direct a narrow band of light onto an incremental area of the platen. The optical assembly 23 also includes a photosensor array 24 that is located in the image plane of lens array 101 in FIGS. 4 and 6, or in the image plane of lens array 100, as shown in FIG. 5. It is to be understood that the first and second gradient index lens arrays (100, 101) can be moved such that either lens array has an optical conjugate relationship with the illuminated portion of the image bearing member 22 and with the photosensor array 24. Furthermore, that relationship can remain fixed for the duration of the document scanning process. As the focal length of the lens array 100 differs from the focal length of the lens array 101, the photosensor array 24 may require repositioning to achieve the proper optical conjugate relationship.

Figure 7:
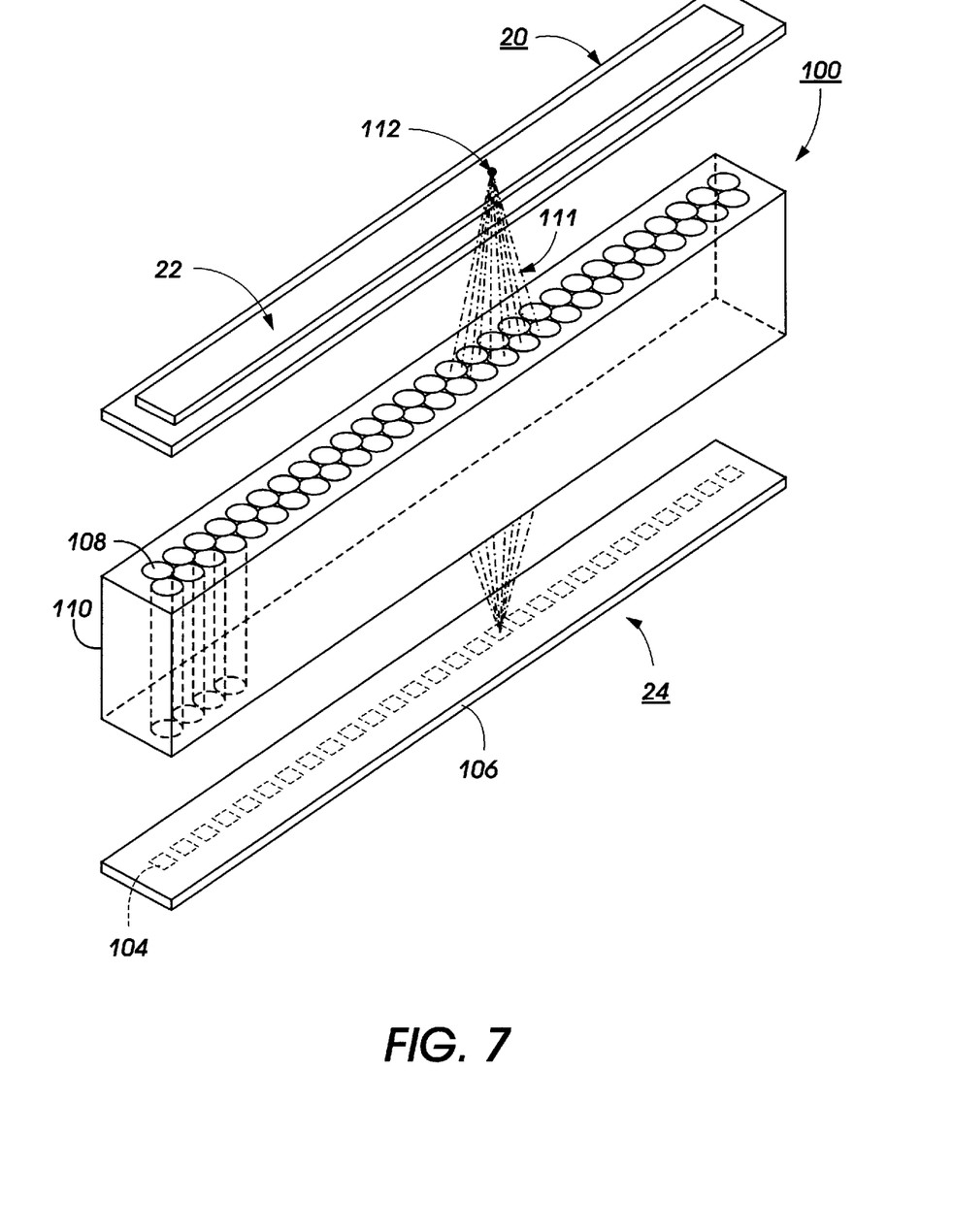
FIG. 7 schematically depicts a generic gradient index lens in it optical conjugate relationship between object and image.

FIG. 7 illustrates a simplified view of the relationship between the photosensor array 24 and the gradient index lens array 100. It is to be understood that, except for differences in the geometry and glass composition of the gradient index lens rods of the gradient index lens array 101, that the relationship between the photosensor array 24 and the gradient index lens array 101 is similar when lens array 101 is moved into optical conjugate relationship with the photosensor array 24. As shown in FIG. 7, the photosensor array 24 is comprised of a plurality of individual photodiodes 104 on a substrate 106. Spaced above the photodiodes is the gradient index lens array 100 that is comprised of individual gradient index rods 108 that are embedded in a shell 110. The rods focus incoming light 111 from an object point 112 on the image bearing surface 22 onto the photodiodes 104, which convert received photons into electrons that can be amplified and applied to a RIS signal processor 49 (see FIG. 4).

For illustrative purposes, the gradient index lens 100 consists of a two row array of the commercially available SLA09 SELFOC lens using standard values of $n_o=1.608$, $\sqrt{A}=0.1783$ mm$^{-1}$, $R=0.5225$ mm, and cut to a length that produces a 48 mm total conjugate. However, the gradient index lens array 101 consists of a two row array of the SLA04 SELFOC lens having standard values of $n_o=1.534$, $\sqrt{A}=0.1607$ mm$^{-1}$, $R=0.2815$ mm, and cut to a length that produces a similar 48 mm total conjugate. While other arrangements are possible, such as using four rows of fibers or lenses with differing total conjugates, those given above represent a good tradeoff between cost and performance. The primary differences between the first and second gradient index lens arrays 100 and 101 are their depth of focus and their radiometric efficiency. Beneficially, the gradient index lens array 100 has a depth of focus of about 1.2 mm, while the gradient index lens array 101 has a depth of focus of about 2.6 mm.

Turning back to FIG. 4, the RIS selector 48 receives a signal from a system control unit 54. The RIS selector activates the mechanical positioning mechanism to move either lens array 100 or lens array 101 into position, based on the desired depth of focus for the current scanning cycle. The signal processor 49 processes its input signals from the photosensor array 24 as required to enable the system 2 to store and handle the image data in the form required to carry out it proper functions. For example, the processor 49 may filter, screen, crop or scale its received information, convert it to 8 bit gray level data, or adjust according to operator set enhancements. The processor outputs image signals that are input to the controller section 7.

Still referring to FIG. 4, the controller section 7 is, for explanation purposes, divided into a user interface (UI) 52, the system controller 54, a main memory 56, an image manipulation section 58, and an image output controller 60.

As best shown in FIG. 3 the UI 52 beneficially includes a combined operator controller/CRT display that has an interactive CRT touchscreen 62, a keyboard 64, and a mouse 66. The UI 52 interfaces the operator with the reproduction system 2, thereby enabling the operator to program print jobs and to enter other instructions, to obtain system operating information, programming information, and/or diagnostic information. Important to the present invention is that an operator can use the touchscreen 62 to select either document copying or book copying.

For purposes of illustration, assume that lens array 100 is designed to provide maximum radiometric efficiency with minimal depth of focus, and lens array 101 is designed to provide maximum depth of focus with lower radiometric efficiency. When document copying is selected, the UI informs the system controller 54 that a document is being copied. In turn, the system controller sends a signal to the RIS selector 48 that causes the RIS selector to position lens array 100 into an optical conjugate relationship with photosensor array 24. Since the depth of focus is accurately controlled by placing the document flat on the platen, radiometric efficiency is more important than a large depth of focus, thus permitting scanning speed to be maximized.

However, if a book is being copied, the operator selects book copying. This causes the UI to inform the system controller 54 that a book is being copied. In turn, the system controller sends a signal to the RIS selector 48 to position lens array 101 into optical conjugate relationship with photosensor array 24. Since a book's binding causes the image-bearing member 22 to vary over a small range of positions above the transparent platen 20, a large depth of focus is more important than radiometric efficiency. Thus with lens array 101 in position above the photosensor array 24, the required large depth of focus is achieved, but typically at a slower scanning speed to compensate for the reduced radiometric efficiency. In either event, the image data from the signal processor 49 is stored in a memory 56. That memory beneficially also stores the operating program for the reproduction system 2 and any machine operating data.

Turning once again to FIG. 4, when image data in the main memory 56 requires further processing, or when it is required for display on the touchscreen 62, or when it is required by the printer section 8, the image data is recalled from the memory 56. When further processing other than that provided by the signal processor 49 is required, the image data is transferred to an image manipulation section 58 where additional processing steps such as collation, and decomposition can be carried out.

After processing, the data may be returned to main memory 56, sent to UI 52 for display on touchscreen 62, or sent to image output controller 60. The scanned image data input from signal processor 49 of scanner section 6 is operated on by controller section 7. The output of controller 7 operates a Raster Output Scanner (ROS) 62 in printer section 8. ROS 62 incorporates a laser which generates output beams which are in turn scanned across a moving photoreceptor located in print module 64. Image lines are exposed at the photoreceptor with each scan cycle to create latent images. Those latent images are subsequently developed and transferred to a substrate. The image on the substrate is then fixed, usually using heat and pressure, to the substrate.

Figure 8:
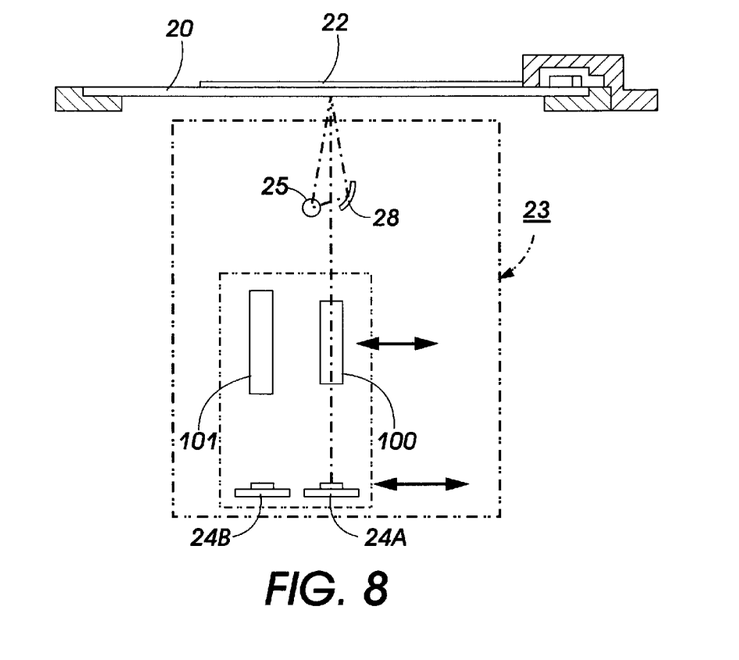
FIG. 8 is a schematic view of an alternative raster input scanner system positioned relative to an imaging-bearing member such that a first photosensor array receives light that is reflected by the image-bearing member and that passes through a first gradient index lens array.
Figure 9:
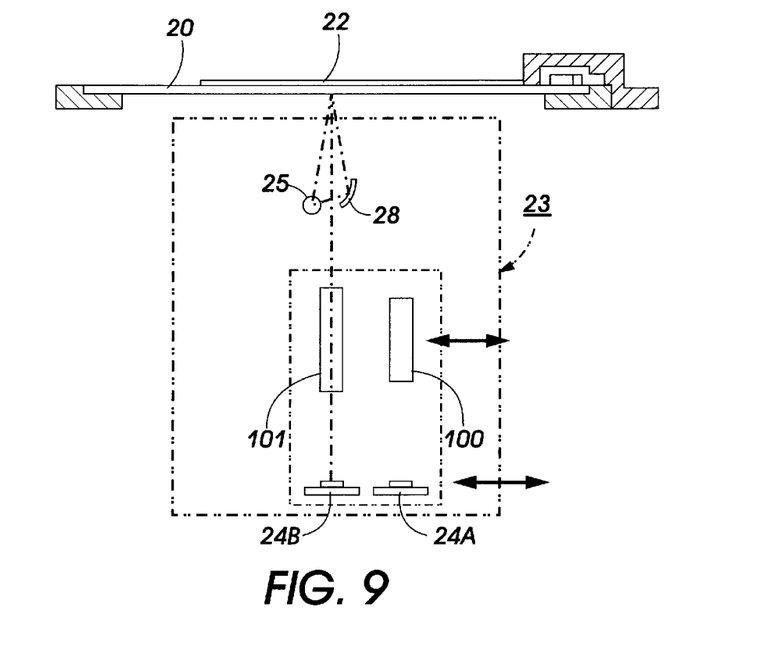
FIG. 9 shows the raster input scanner system of FIG. 8 positioned such that a second photosensor array receives light that is reflected by the image-bearing member and that passes through a second gradient index lens array.

The foregoing has described a reproduction system 2 and a raster input scanner having two gradient index lens arrays and one photosensor. In that raster input scanner the gradient index lens arrays have different focal lengths and are mechanically positioned such that light reflected from the image-bearing surface selectively passes through one or the other of the lens onto the single photosensor. An alternative raster input scanner is shown in FIGS. 8 and 9. That raster input scanner uses two gradient index lens arrays, the gradient index arrays 100 and 101, and two photosensors, the photosensors 24A and 24B. The photosensor 24A is spatially fixed relative to the gradient index lens array 100 such that light that passes through that lens array is focused on the photosensor 24A The photosensor 24B is spatially fixed relative to the gradient index lens array 101 such that light that passes through that lens array is focused on the photosensor 24B. Furthermore, the gradient index lens arrays and photosensors are mechanically movable relative to the light source 25 and the image-bearing member 22. FIG. 8 shows the raster input scanner positioned such that light reflected by the image-bearing member passes through the gradient index lens array 100 and onto the photosensor 24A. FIG. 9 shows the raster input scanner moved such that light reflected by the image-bearing member passes through the gradient index lens array 101 and onto the photosensor 24B.

It is to be understood that while the figures and the above description illustrate the present invention, they are exemplary only. Others who are skilled in the applicable arts will recognize numerous modifications and adaptations of the illustrated embodiments that will remain within the principles of the present invention. For example, other embodiments may include, but are not limited to, the attachment of separate photosensor arrays to each of the gradient index lens arrays, thus more conveniently accommodating differing total conjugates of the two lens arrays, or using two tilted lens arrays that image a common object line on the image bearing surface simultaneously to their attached photosensor arrays. Such other embodiments may also substitute arrays of conventional refractive or reflective imaging elements for the described arrays of gradient index lenses. Therefore, the present invention is to be limited only by the appended claims.

What is claimed:

1. An electronic reproduction system comprised of:
   an input scanner for incrementally scanning an image bearing member, said input scanner including:
   a light source for emitting light toward an image-bearing member;
   a light sensor array comprised of discrete light sensors for converting photons into electrical signals;

a first gradient index lens array having a first depth of focus and movable relative to said light sensor array;

a movable second gradient index lens array having a second depth of focus that is different than said first depth of focus and movable relative to said light sensor array;

a selector for selectively moving either said first gradient index lens array or said second gradient index lens array into an optical conjugate relationship with said image bearing member and said array of light sensors; and a controller for controlling the operation of the reproduction system; and a printer for rendering a printed image of said digital representation of the image on the image bearing member;

wherein said selector receives an operator induced signal that selects either said first gradient index lens array or said second gradient lens array that is to be placed into said optical conjugate relationship.

2. The input scanner according to claim 1, wherein said discrete light sensors are photodiodes.

3. The input scanner according to claim 1, wherein said first gradient index lens array and said second gradient index lens array are spatially fixed relative to each other.

4. The input scanner according to claim 1, further including a platen for receiving the image bearing member.

5. The input scanner according to claim 1, further including a signal processor that processes electrical signals from said array of light sensors.

6. An input scanner for imaging an image bearing member, said input scanner comprised of:

a light source for emitting light toward an image bearing member;

a movable first input system comprised of a first array of light sensors for converting photons into electrical signals and a first array of lenses for focusing light reflected from the image bearing member onto said first array of light sensors, wherein said first array of lenses has a first depth of focus;

a movable second input system comprised of a second array of light sensors for converting photons into electrical signals and a second array of lenses for focusing light reflected from the image bearing member onto said second array of light sensors, wherein said second array of lenses has a second depth of focus that is greater than the depth of focus of said first array of lenses; and a selector for selectively moving either said first input system or said second input system into an optical relationship with said light source and with the image bearing member such that said selected input system is in position to scan an image on the image bearing member;

wherein said selector receives an operator induced signal that directs the selection of either said first input system or said second input system.

7. The input scanner according to claim 6, wherein said first array of lenses and second array of lenses are gradient index lenses.

8. The input scanner according to claim 6, wherein said first array of light sensors and second array of light sensors are photodiodes.

9. The input scanner according to claim 6, wherein said first array of lenses and said second array of lenses are adjacent.

10. The input scanner according to claim 6, further including a platen for receiving an image bearing member.

11. An electronic reproduction system comprised of:

an input scanner for incrementally scanning an image bearing member, said input scanner including:

a light source for emitting light toward an image bearing member;

a first array of light sensors for converting photons into electrical signals;

a first array of lenses for focusing light reflected from the image bearing member onto said first array of light sensors, wherein said first array of lenses has a first depth of focus;

a second array of light sensors for converting photons into electrical signals;

a second array of lenses for focusing light reflected from the image bearing member onto said second array of light sensors, wherein said second array of lenses has a second depth of focus that is greater than the depth of focus of the of said first array of lenses;

a selector for selectively positioning either said first array of lenses and said first array of sensors, or said second array of lenses and said second array of sensors into an optical conjugate relationship with the image bearing member;

a controller for controlling the operation of the reproduction system;

a printer for rendering a printed image of said digital representation of the image on the image bearing member; and a signal processor that processes electrical signals from said first array of light sensors when the said first array of lenses is in optical conjugate relationship with said image bearing member, or said second array of light sensors when said second array of lenses is in optical conjugate relationship with said image bearing member.

12. The electronic reproduction system according to claim 11 wherein the said first array of lenses and said second array of lenses include gradient index lenses.

13. The electronic reproduction system according to claim 11, wherein said first array of lenses and said second array of lenses have substantially equal total conjugates.

14. The electronic reproduction system according to claim 11, wherein said first array of light sensors and said second array of light sensors are photodiodes.

15. The electronic reproduction system according to claim 11, wherein said first array of lenses and said second array of lenses are e adjacent.

16. The electronic reproduction system according to claim 11, further including a platen for receiving an image bearing member.

17. An electronic reproduction system comprised of:

an input scanner for incrementally scanning an image bearing member, said input scanner including:

a light source for emitting light toward an image bearing member;

a first array of light sensors for converting photons into electrical signals;

a first array of lenses for focusing light reflected from the image bearing member onto said first array of light sensors, wherein said first array of lenses has a first depth of focus;

a second array of light sensors for converting photons into electrical signals;

a second array of lenses for focusing light reflected from the image bearing member onto said second array of light sensors, wherein said second array of lenses has a second depth of focus that is greater than the depth of focus of the of said first array of lenses; and a selector for selectively positioning either said first array of lenses and said first array of sensors, or said second array of lenses and said second array of sensors into an optical conjugate relationship with the image bearing member;

a controller for controlling the operation of the reproduction system; and a printer for rendering a printed image of said digital representation of the image on the image bearing member;

wherein said selector receives an operator induced signal that select the array of lenses to be placed into said optical conjugate relationship with the image bearing member, and to select the source of the electrical signals that are processed.

18. The electronic reproduction system according to claim 11, wherein the said first array of lenses and said second array of lenses include gradient index lenses.

19. The electronic reproduction system according to claim 11, wherein said first array of lenses and said second array of lenses have substantially equal total conjugates.

20. The electronic reproduction system according to claim 11, wherein said first array of light sensors and said second array of light sensors are photodiodes.

21. The electronic reproduction system according to claim 11, wherein said first array of lenses and said second array of lenses are adjacent.

22. The electronic reproduction system according to claim 11, further including a platen for receiving an image bearing member.

23. The electronic reproduction system according to claim 11, further including a signal processor that processes electrical signals from said first array of light sensors when the said first array of lenses is in optical conjugate relationship with said image bearing member, or said second array of light sensors when said second array of lenses is in optical conjugate relationship with said image bearing member.

* * * * *